US012607060B1

(12) United States Patent
Lu

(10) Patent No.: US 12,607,060 B1
(45) Date of Patent: Apr. 21, 2026

(54) PUNCH-FREE MOUNTING ASSEMBLY AND CURTAIN

(71) Applicant: Ningbo Zhenfei Decorated Curtain Co., Ltd., Yuyao (CN)

(72) Inventor: Jiefei Lu, Yuyao (CN)

(73) Assignee: Ningbo Zhenfei Decorated Curtain Co., Ltd., Yuyao (CN)

(*) Notice: Subject to any disclaimer, the term of this patent is extended or adjusted under 35 U.S.C. 154(b) by 0 days.

(21) Appl. No.: 19/328,297

(22) Filed: Sep. 15, 2025

(30) Foreign Application Priority Data

Dec. 11, 2024 (CN) ......................... 202423050079.7

(51) Int. Cl.

| | |
|---|---|
| ***E06B 9/50*** | (2006.01) |
| ***E06B 9/40*** | (2006.01) |
| ***E06B 9/58*** | (2006.01) |
| *E06B 9/262* | (2006.01) |

(52) U.S. Cl.

CPC ................ *E06B 9/50* (2013.01); *E06B 9/262* (2013.01); *E06B 2009/2625* (2013.01); *E06B 2009/407* (2013.01); *E06B 2009/587* (2013.01)

(58) Field of Classification Search

CPC ........ E06B 9/42; E06B 9/50; E06B 2009/407; E06B 2009/587

USPC .............................................................. 16/90

See application file for complete search history.

(56) References Cited

U.S. PATENT DOCUMENTS

| | | | | |
|---|---|---|---|---|
| 4,373,569 | A * | 2/1983 | Barettella | E06B 9/50 160/323.1 |
| 8,596,594 | B2 * | 12/2013 | Shevick | E06B 7/28 248/200.1 |
| 8,925,747 | B1 * | 1/2015 | Hanley | A47H 1/022 211/105.6 |
| 9,410,367 | B2 * | 8/2016 | Coker | E06B 9/323 |
| 9,926,740 | B2 * | 3/2018 | Pham | E06B 9/42 |
| 10,781,635 | B2 * | 9/2020 | Cheng | E06B 9/80 |
| 11,215,007 | B2 * | 1/2022 | Schorling | E06B 9/40 |
| 12,024,947 | B2 * | 7/2024 | Geiger | E06B 9/50 |
| 12,303,053 | B1 * | 5/2025 | Moss | A47H 1/022 |
| 2025/0320776 | A1 * | 10/2025 | Geiger | A47H 1/13 |

* cited by examiner

*Primary Examiner* — Jeffrey O'Brien

(74) *Attorney, Agent, or Firm* — Bayramoglu Law Offices

(57) ABSTRACT

A punch-free mounting assembly and a curtain are provided. The punch-free mounting assembly includes: a housing, a rotating base, and a main body, where the rotating base is partially accommodated in the housing and is rotatably connected to the housing; the rotating base is provided with an axially-through accommodation cavity; the main body is slidably fitted through the accommodation cavity; a limiting member is slidably sleeved on the main body; an outer wall of the limiting member is threadedly connected to an inner wall of the accommodation cavity; a first limiting portion is radially formed outside the main body; the first limiting portion is slidably connected to the accommodation cavity and abuts against one end of the limiting member; and when the rotating base is rotated, the limiting member moves axially along the accommodation cavity until the limiting member is tightly pressed against the first limiting portion.

18 Claims, 8 Drawing Sheets

PUNCH-FREE MOUNTING ASSEMBLY AND CURTAIN

CROSS-REFERENCE TO THE RELATED APPLICATIONS

This application is based upon and claims priority to Chinese Patent Application No. 202423050079.7, filed on Dec. 11, 2024, the entire contents of which are incorporated herein by reference.

TECHNICAL FIELD

The present disclosure relates to the technical field of curtains, and in particular to a punch-free mounting assembly and a curtain.

BACKGROUND

Currently, most curtain products on the market are fixedly mounted using a bracket or support. Before mounting, a mounting hole is punched at the mounting position. Then, the bracket or support is fixed into the mounting hole with a screw, and the curtain rod is mounted on the bracket or support. This curtain mounting method is relatively complex, requires the use of a professional punching tool, and involves cumbersome mounting operations. Consequently, people usually hire professional workers to mount curtains for their homes or offices. This necessitates additional mounting fees, increases the cost of curtain mounting, and makes mounting and removal of curtains very inconvenient. Furthermore, punching the mounting hole in the wall damages the original decoration or building structure, poses significant mounting difficulties, and carries certain safety risks.

SUMMARY

In order to address at least one aspect of the above-mentioned problems, the present disclosure first provides a punch-free mounting assembly, including: a housing, a rotating base, and a main body, where the rotating base is partially accommodated in the housing and is rotatably connected to the housing; the rotating base is provided with an axially-through accommodation cavity; the main body is slidably fitted through the accommodation cavity; a limiting member is slidably sleeved on the main body; an outer wall of the limiting member is threadedly connected to an inner wall of the accommodation cavity; a first limiting portion is radially formed outside the main body; the first limiting portion is slidably connected to the accommodation cavity and abuts against one end of the limiting member; and when the rotating base is rotated, the limiting member moves axially along the accommodation cavity until the limiting member is tightly pressed against the first limiting portion, thereby limiting axial movement of the main body.

Optionally, a positioning pin is fitted through the housing; an outer wall of the rotating base is provided with an annular positioning groove; and one end of the positioning pin is limited within the positioning groove and is rotatably connected to the positioning groove, such that the rotating base is axially positioned.

Optionally, a second limiting portion is radially formed outside the main body; the second limiting portion is axially slidably connected to the accommodation cavity; a spring is sleeved on the main body; and the spring includes one end abutting against the second limiting portion and the other end abutting against an inner bottom wall of the housing or the rotating base.

Optionally, the limiting member is slidably sleeved on the second limiting portion; and a cross-section of the second limiting portion is non-circular, thereby preventing rotation between the limiting member and the main body.

Optionally, the main body is axially slidably connected to the housing; a bottom of the main body is connected to a limiting piece; and the limiting piece abuts against a bottom of an outer wall of the housing to limit a movement distance of the main body.

Optionally, the housing is internally provided with a thrust ball bearing; the thrust ball bearing is sleeved on the main body; and two axial ends of the thrust ball bearing respectively abut against a bottom wall of the rotating base and an inner bottom wall of the housing.

Optionally, the rotating base is provided with a turntable portion; and the turntable portion is provided with a plurality of teeth or a regular-polygon cross-section.

Optionally, the punch-free mounting assembly further includes a connecting member; the connecting member is connected to a rubber pad for abutting against a wall; an upper end of the main body is recessed to form a mounting cavity; a bottom of the connecting member protrudes to form a connecting portion; a first limiting groove is recessed in the mounting cavity; a first limiting member is radially formed outside the connecting portion; and the first limiting member is limited within the first limiting groove and is movably connected to the first limiting groove, thereby correcting a deviation and adapting to a non-vertical wall surface.

Optionally, the housing is a first housing; the first housing is rotatably connected to the main body, facilitating mounting on a roller shade; alternatively, the housing is a second housing; the second housing is internally provided with a protruding second limiting member; a second limiting groove is recessed in the main body; and the second limiting member is limited within the second limiting groove and is axially slidably connected to the second limiting groove, thereby preventing rotation between the second housing and the main body, facilitating mounting on a pleated shade.

Compared to the prior art, the punch-free mounting assembly in the present disclosure is adapted to be connected to one end of a shade rod. During mounting, the main body and the other end of the shade rod respectively abut against wall surfaces. The rotating base is rotated, causing the limiting member to move axially under the action of a thread until it is tightly pressed against the first limiting portion. Thus, the main body cannot move axially, thereby locking the position of the main body. The mounting operation is simple and convenient, and does not require punching a hole in the wall.

Furthermore, the present disclosure provides a curtain, including the punch-free mounting assembly as described above.

Compared to the prior art, in the present disclosure, the curtain shares the same advantages as the above-described punch-free mounting assembly, which will not be reiterated here.

REFERENCE NUMERALS

Figure 1:
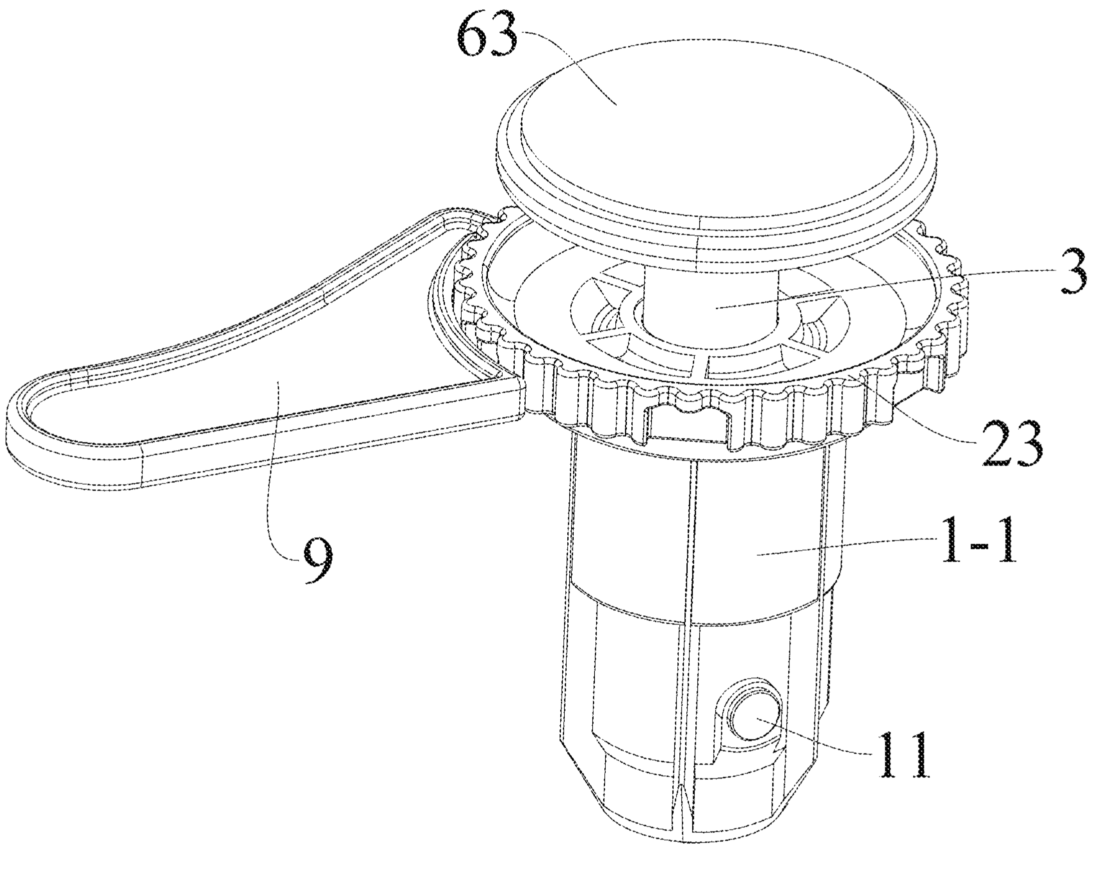
FIG. 1 is a structural view of a punch-free mounting assembly and a wrench according to Embodiment 1 of the present disclosure.

1-1. first housing; 1-2. second housing; 11. positioning pin; 12. second limiting member; 2. rotating base; 21. accommodation cavity; 22. positioning groove; 23. turntable portion; 3. main body; 31. first limiting portion; 32. second limiting portion; 33. spring; 34. limiting piece; 35. mounting cavity; 36. first limiting groove; 37. second limiting groove; 4. limiting member; 5. thrust ball bearing; 6. connecting member; 61. connecting portion; 62. first limiting member; 63. rubber pad; 7. cord controller; 8. mounting shell; 81. shielding shell; 82. sealing cover; and 9. wrench.

DETAILED DESCRIPTION OF THE EMBODIMENTS

To make the above objectives, features, and advantages of the present disclosure more comprehensible, the specific embodiments of the present disclosure are described in detail below with reference to the drawings.

In the description of the present disclosure, it should be understood that orientation or position relationships indicated by terms such as "upper" and "lower" are orientation or position relationships of the product in normal use.

In addition, the terms such as "first" and "second" are used only for descriptive purposes, and should not be construed as indicating or implying relative importance or implying the number of indicated technical features. Therefore, features defined by "first" and "second" may explicitly or implicitly include at least one of the features.

Embodiment 1 of the present disclosure provides a punch-free mounting assembly. As shown in FIG. 1 to FIG. 7, the punch-free mounting assembly includes a housing, rotating base 2, and main body 3. The rotating base 2 is partially accommodated in the housing and is rotatably connected to the housing. The rotating base 2 is provided with axially-through accommodation cavity 21. The main body 3 is slidably fitted through the accommodation cavity 21. Limiting member 4 is slidably sleeved on the main body 3. An outer wall of the limiting member 4 is threadedly connected to an inner wall of the accommodation cavity 21. First limiting portion 31 is radially formed outside the main body 3. The first limiting portion 31 is slidably connected to the accommodation cavity 21 and abuts against one end of the limiting member 4. When the rotating base 2 is rotated, the limiting member 4 moves axially along the accommodation cavity 21 until it is tightly pressed against the first limiting portion 31, thereby limiting axial movement of the main body 3.

Optionally, the housing is first housing 1-1. The first housing 1-1 is rotatably connected to the main body 3, facilitating mounting on a roller shade. Alternatively, the housing is second housing 1-2. The second housing 1-2 is internally provided with protruding second limiting member 12. Second limiting groove 37 is recessed in the main body 3. The second limiting member 12 is limited within the second limiting groove 37 and is axially slidably connected to the second limiting groove 37, thereby preventing rotation between the second housing 1-2 and the main body 3, facilitating mounting on a pleated shade.

Embodiment 1

There are many types of curtains. In the present disclosure, a roller shade and a pleated shade are taken as examples. Embodiment 1 is suitable for mounting on the roller shade. The roller shade typically includes a shade rod (not shown in FIG. 7) and cord controller 7. Two ends of the shade rod are connected to the cord controller 7 and the punch-free mounting assembly, respectively. The cord controller 7 is connected to a cord (not shown in the figure). A user needs to pull the cord so as to move the roller shade up and down. Therefore, the cord controller 7 rotates under the pulling force applied by the user, and the punch-free mounting assembly rotates together under the transmission effect of the shade rod.

In Embodiment 1, the housing is the first housing 1-1. The shade rod is connected to the first housing 1-1, thereby driving the first housing 1-1 to rotate together.

Figure 2:
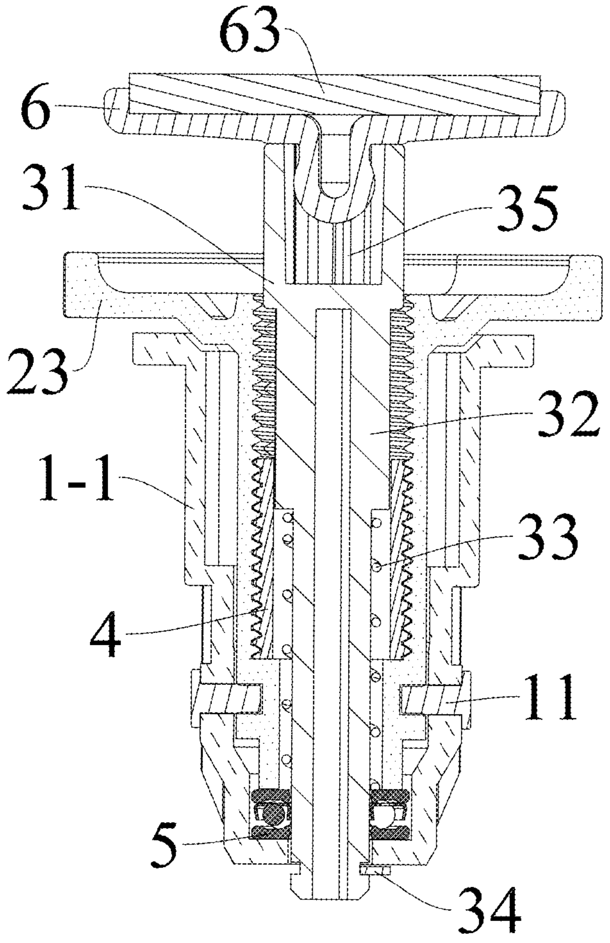
FIG. 2 is a cross-sectional view of the punch-free mounting assembly according to Embodiment 1 of the present disclosure.
Figure 3:
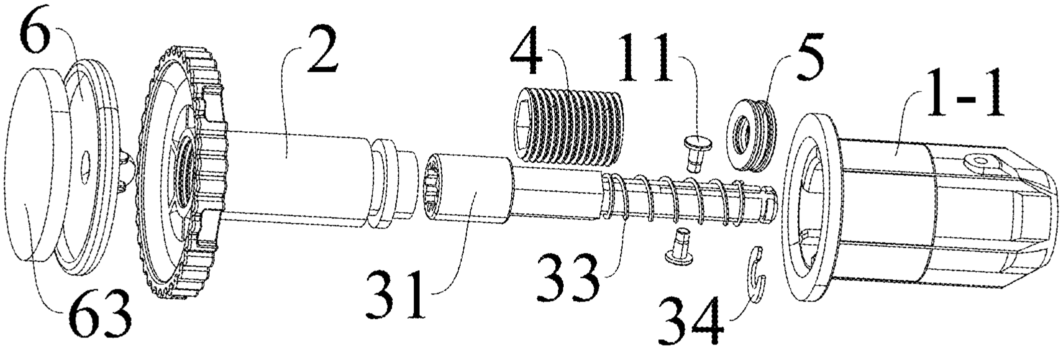
FIG. 3 is an exploded view of the punch-free mounting assembly according to Embodiment 1 of the present disclosure.

As shown in FIG. 1 to FIG. 3, the main body 3, the rotating base 2, and the first housing 1-1 are arranged coaxially. The main body 3 is accommodated in the accommodation cavity 21. The rotating base 2 is partially accommodated in the first housing 1-1. The main body 3 passes through both the rotating base 2 and the first housing 1-1 and moves back and forth axially.

The punch-free mounting assembly in the present disclosure is adapted to be connected to one end of the shade rod. During mounting, the main body 3 and the other end of the shade rod respectively abut against wall surfaces. The rotating base 2 is rotated, causing the limiting member 4 to move axially under the action of a thread until it is tightly pressed against the first limiting portion 31. Thus, the main body 3 cannot move axially, thereby locking the position of the main body 3. The mounting operation is simple and convenient, and does not require punching a hole in the wall.

Optionally, positioning pin 11 is fitted through the first housing 1-1. An outer wall of the rotating base 2 is provided with annular positioning groove 22. One end of the positioning pin 11 is limited within the positioning groove 22 and is rotatably connected to the positioning groove 22, such that the rotating base 2 is axially positioned.

Figure 4:
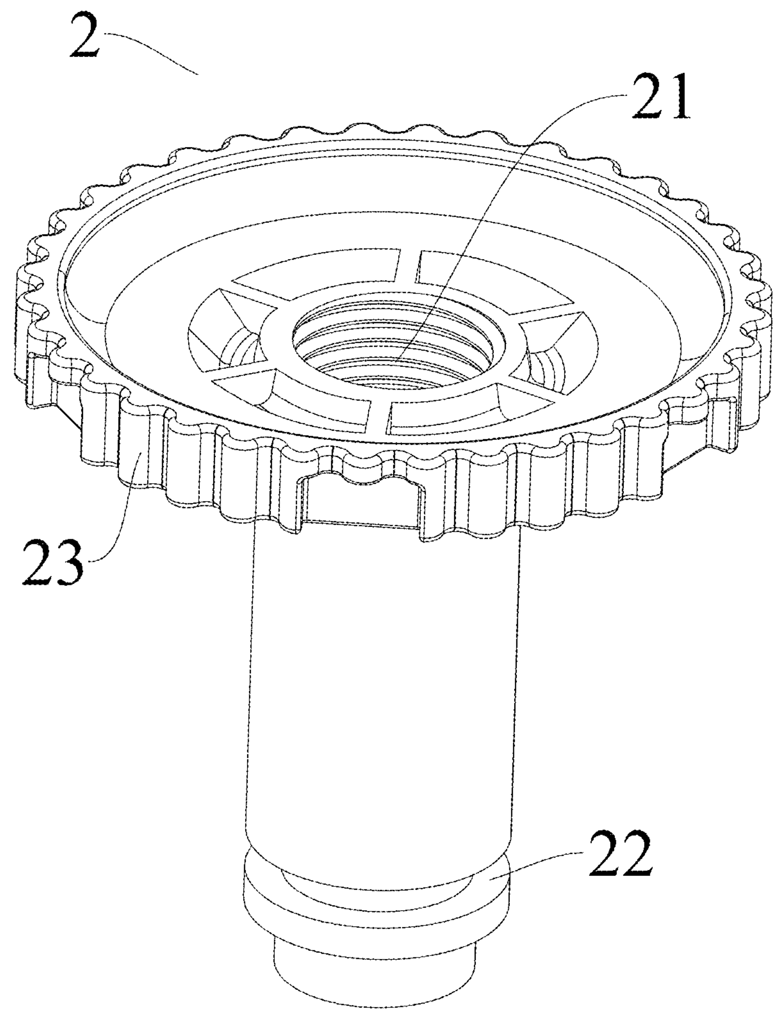
FIG. 4 is a structural view of a rotating base according to Embodiment 1 of the present disclosure.

As shown in FIG. 2 and FIG. 4, the positioning groove 22 is axially limited by the positioning pin 11. When the rotating base 2 is rotated forward or reverse, the rotating base 2 does not undergo axial displacement. The limiting member 4 moves back and forth axially under the action of the thread. The forward direction is the clockwise direction or the counterclockwise direction, and the reverse direction is the opposite of the forward direction.

Optionally, second limiting portion 32 is radially formed outside the main body 3. The second limiting portion 32 is axially slidably connected to the accommodation cavity 21. Spring 33 is sleeved on the main body 3. One end of the spring 33 abuts against the second limiting portion 32, and the other end of the spring 33 abuts against an inner bottom wall of the first housing 1-1 or the rotating base 2.

As shown in FIG. 2, in Embodiment 1, the spring 33 is entirely accommodated in the accommodation cavity 21. When the main body 3 is pressed, the main body 3 moves downward, and a bottom end of the second limiting portion 32 compresses the spring 33, causing the spring 33 to accumulate an elastic force. When the external force on the main body 3 is released, the spring 33 pushes the second limiting portion 32, thereby driving the main body 3 back to an original position.

Optionally, the limiting member 4 is slidably sleeved on the second limiting portion 32. A cross-section of the second limiting portion 32 is non-circular, thereby preventing rotation between the limiting member 4 and the main body 3.

Figure 5:
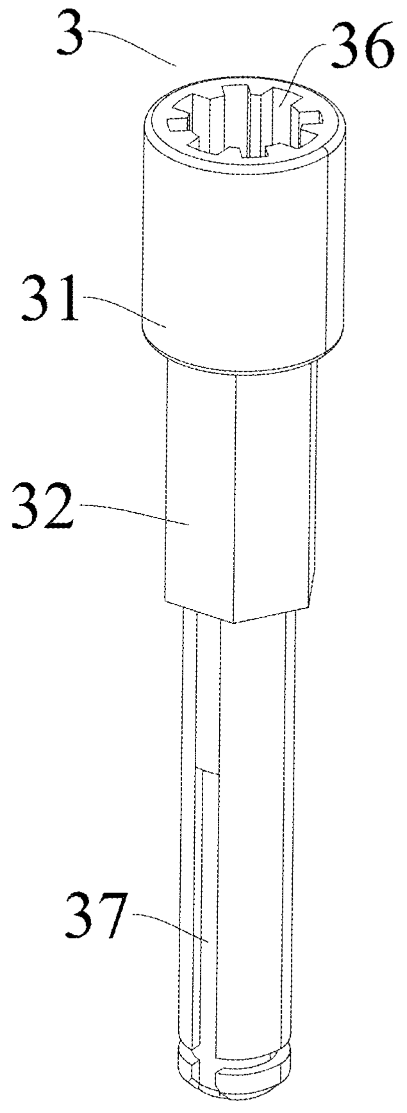
FIG. 5 is a structural view of a main body according to Embodiment 1 of the present disclosure.

As shown in FIG. 5, the second limiting portion 32 is a regular hexagon. The limiting member 4 is adapted to the second limiting portion 32, and no relative rotation can occur between the limiting member 4 and the main body 3. Thus, when the rotating base 2 is rotated, the limiting member 4 can move axially.

Optionally, the main body 3 is axially slidably connected to the first housing 1-1. A bottom of the main body 3 is connected to limiting piece 34. The limiting piece 34 abuts against a bottom of an outer wall of the first housing 1-1 to limit a movement distance of the main body 3.

As shown in FIG. 2 and FIG. 3, the limiting piece 34 is configured to limit an upward movement distance of the main body 3. When the main body 3 moves upward under the action of the spring 33, the limiting piece 34 is limited by abutting against an outer bottom wall of the first housing 1-1, preventing the main body 3 from rebounding excessively and disengaging from a top.

Optionally, thrust ball bearing 5 is disposed in the first housing 1-1. The thrust ball bearing 5 is sleeved on the main body 3. Two axial ends of the thrust ball bearing 5 respectively abut against a bottom wall of the rotating base 2 and an inner bottom wall of the first housing 1-1.

As shown in FIG. 2 and FIG. 3, the thrust ball bearing 5 can reduce axial friction, making rotation between the rotating base 2 and the first housing 1-1 smoother when relative rotation occurs. A lower end of the spring 33 abuts against an upper end of the thrust ball bearing 5.

Optionally, the rotating base 2 is provided with turntable portion 23. The turntable portion 23 is provided with a plurality of teeth or a regular-polygon cross-section.

As shown in FIG. 1, the turntable portion 23 in Embodiment 1 is provided with a plurality of teeth. Grooves are arranged at intervals between the teeth to facilitate rotating the turntable portion 23 with a tool such as the wrench 9, thereby driving the rotation of the rotating base 2.

Optionally, the punch-free mounting assembly further includes connecting member 6. Rubber pad 63 for abutting against a wall is connected to the connecting member 6. An upper end of the main body 3 is recessed to form mounting cavity 35. A bottom of the connecting member 6 protrudes to form connecting portion 61. First limiting groove 36 is recessed in the mounting cavity 35. First limiting members 62 is radially formed outside the connecting portion 61. The first limiting member 62 is limited within the first limiting groove 36 and is movably connected to the first limiting groove 36, thereby correcting a deviation and adapting to a non-vertical wall surface.

Figure 6:
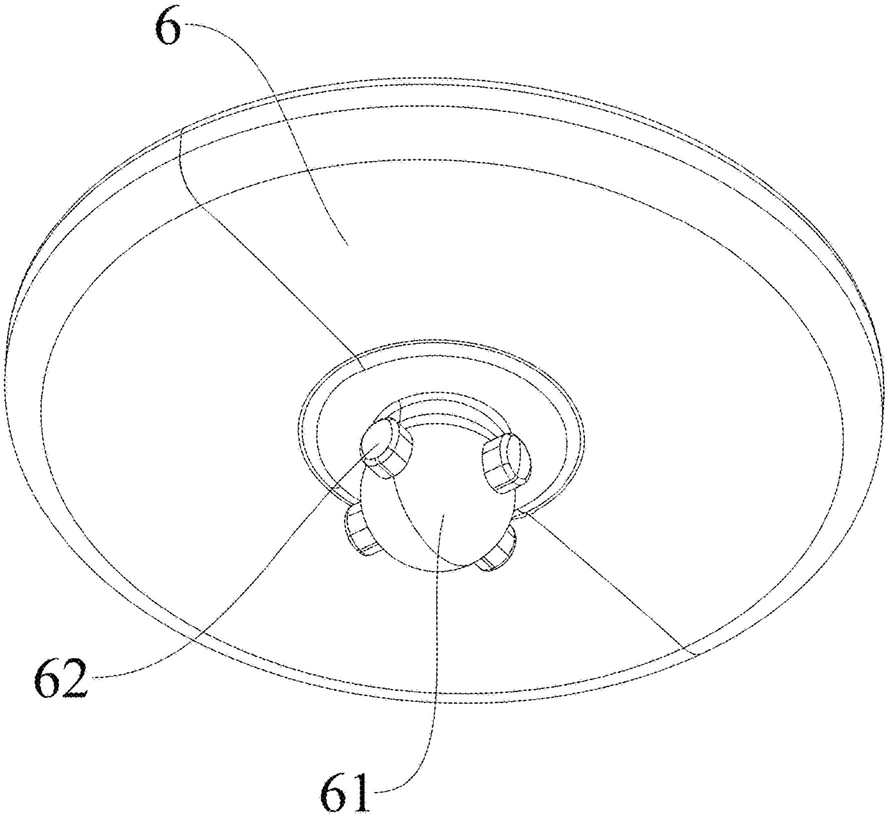
FIG. 6 is a structural view of a connecting member according to Embodiment 1 of the present disclosure.
Figure 7:
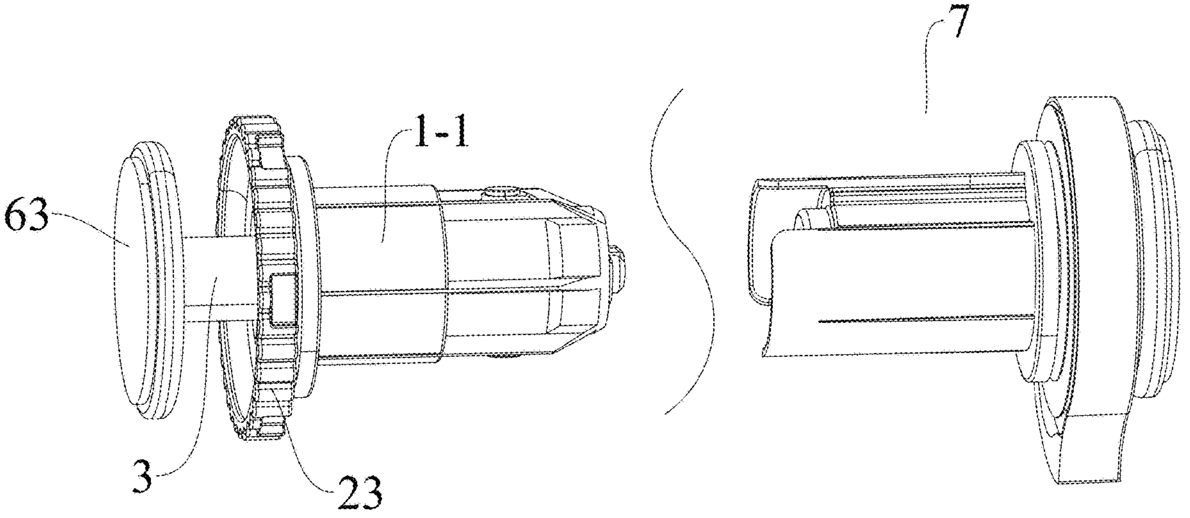
FIG. 7 is a schematic diagram of a mounting direction of the punch-free mounting assembly and a cord controller according to Embodiment 1 of the present disclosure.

As shown in FIG. 2, FIG. 5, and FIG. 6, the rubber pad 63 is configured to increase friction with the wall. An upper surface of the rubber pad 63 is perpendicular to a central axis of the main body 3 to adapt to a vertical wall surface, thereby facilitating mounting. The connecting portion 61 is approximately spherical. There are four first limiting members 62. The four first limiting members 62 are uniformly distributed on front, rear, left, and right sides of the connecting portion 61. A width of the first limiting groove 36 is slightly greater than a width of the first limiting member 62, allowing the connecting member 6 to move slightly relative to the main body 3. This can change the angle between the upper surface of the rubber pad 63 and the central axis of the main body 3, adapting to a non-vertical wall surface. The design can correct small angular deviations of the wall surface, enabling the shade rod to be mounted parallel to the horizontal plane.

The mounting steps of Embodiment 1 are as follows.

To mount the roller shade, the rotating base 2 is rotated forward, causing the limiting member 4 to move away from the first limiting portion 31, thereby reserving space for axial movement of the main body 3. Then, the rubber pad 63 abuts against one side of the wall to press the main body 3, such that the main body 3 moves axially, making space for the shade rod and the cord controller 7. The cord controller 7 abuts against the other side of the wall. The position of the shade rod is adjusted to be parallel to the horizontal plane. The pressure on the main body 3 is released, allowing the main body 3 to move back towards its original position under the drive of the spring 33. The rotating base 2 is rotated. Under the combined action of the thread and the second limiting portion 32, the limiting member 4 moves axially until it is tightly pressed against the first limiting portion 31, preventing the main body 3 from moving towards one end of the cord controller 7, thereby completing the mounting. The operation is simple and convenient, allowing users to perform mounting themselves and reducing costs. Furthermore, there is no need to punch a mounting hole in the wall, avoiding damage to the original decoration or building structure. In case of the roller shade, the user pulls the cord, causing the cord controller 7 to drive the first housing 1-1 to rotate. The first housing 1-1 rotates relative to the rotating base 2. The thrust ball bearing 5 reduces friction, allowing the first housing 1-1 to cooperate with the cord without affecting the axial mounting effect.

Embodiment 2

Figure 8:
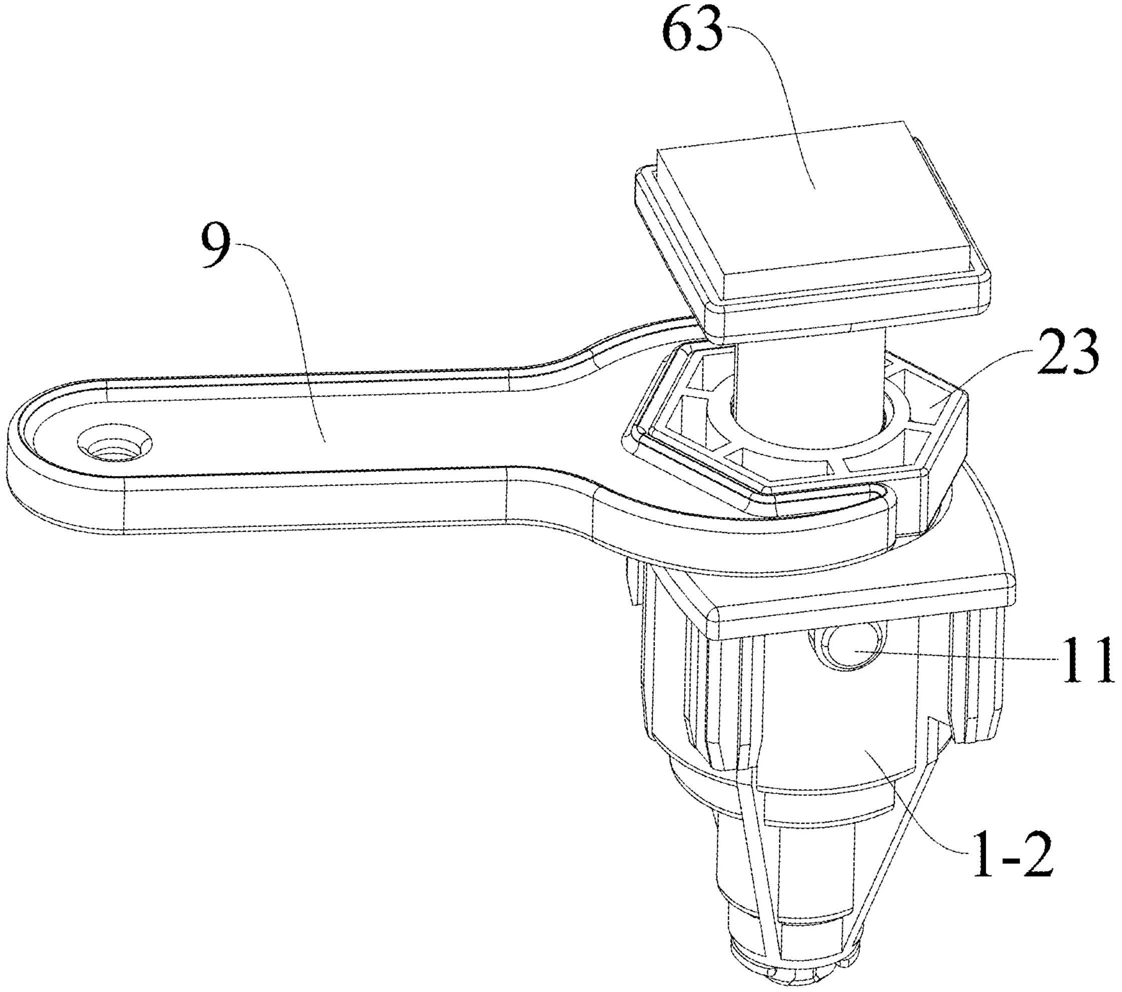
FIG. 8 is a structural view of a punch-free mounting assembly and a wrench according to Embodiment 2 of the present disclosure.
Figure 9:
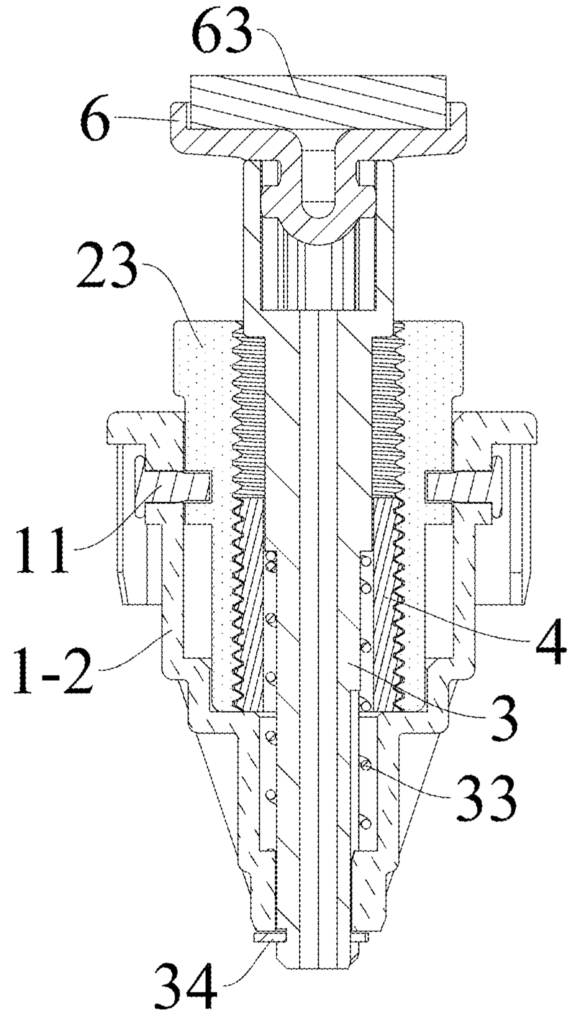
FIG. 9 is a cross-sectional view of the punch-free mounting assembly according to Embodiment 2 of the present disclosure.
Figure 11:
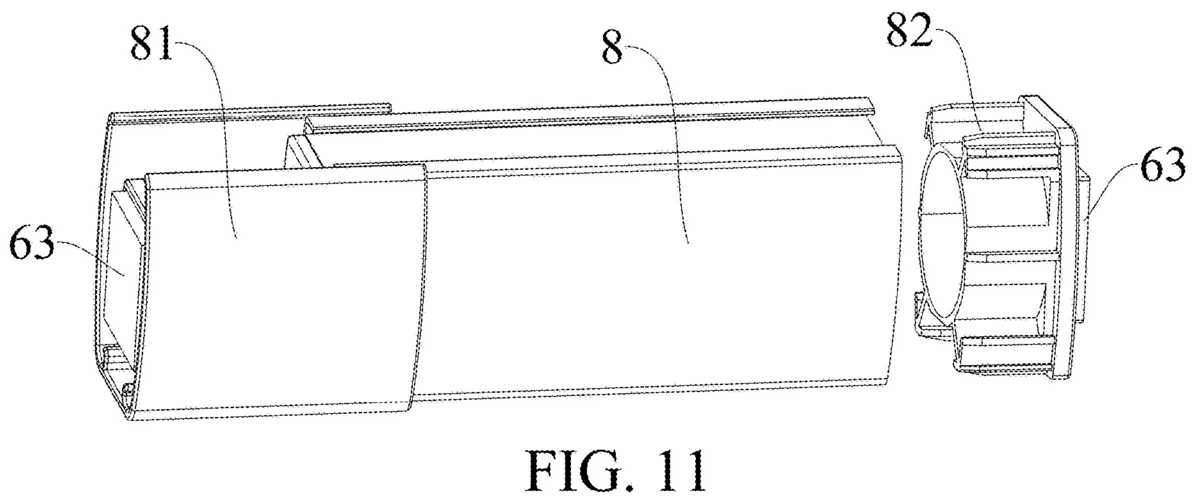
FIG. 11 is a structural view of the punch-free mounting assembly and a mounting shell according to Embodiment 2 of the present disclosure.

As shown in FIG. 8 and FIG. 11, the differences between Embodiment 1 and Embodiment 2 are as follows. In Embodiment 2, the housing is the second housing 1-2, and the punch-free mounting assembly is adapted for mounting on a pleated shade. Because the pleated shade does not require rotating the cord controller 7, the second housing 1-2 does not need to rotate. Therefore, the thrust ball bearing 5 may not be provided. A lower end of the spring 33 abuts against an inner bottom wall of the second housing 1-2. The spring 33 is partially accommodated in the accommodation cavity 21 and partially accommodated in the second housing 1-2.

Figure 10:
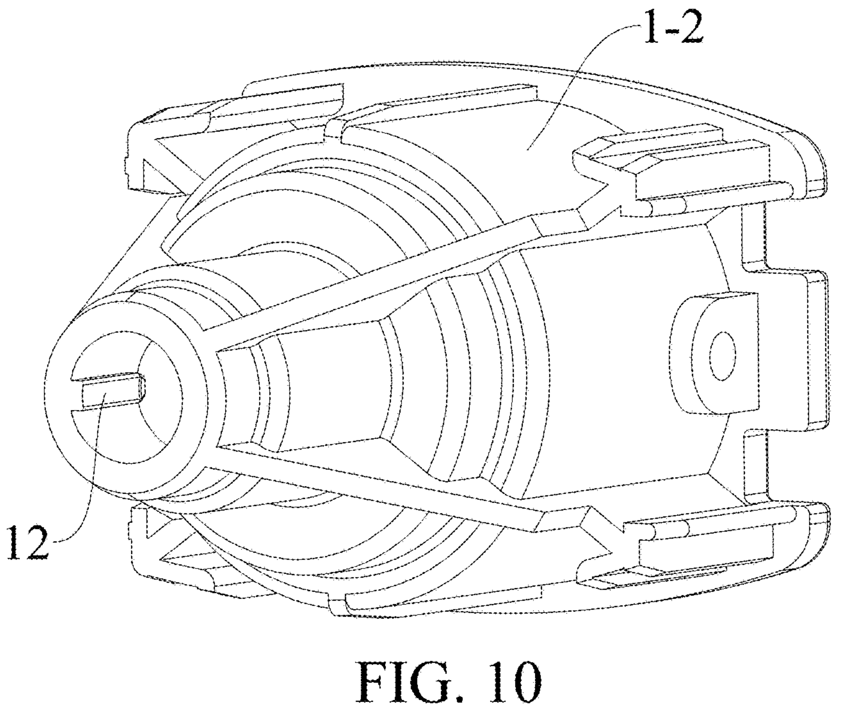
FIG. 10 is a structural view of a second housing according to Embodiment 2 of the present disclosure.

As shown in FIG. 5 and FIG. 10, the second housing 1-2 is also provided with positioning pin 11. The difference between the second housing 1-2 and the first housing 1-1 is that the second housing 1-2 is provided with the second limiting member 12. The second limiting member 12 cooperates with the second limiting groove 37 to prevent the second housing 1-2 from rotating, without affecting the axial sliding of the main body 3.

As shown in FIG. 8, in Embodiment 2, the cross-section of the turntable portion 23 is a regular hexagon. The user can rotate the turntable portion 23 with a tool such as the wrench 9, thereby driving the rotation of the rotating base 2.

As shown in FIG. 11, the pleated shade includes mounting shell 8, shielding shell 81, and sealing cover 82. The mounting shell 8 forms an upper rail of the pleated shade, providing support. Two ends of the mounting shell 8 are fixedly connected to the second housing 1-2 and the sealing cover 82, respectively. The second housing 1-2 and the sealing cover 82 respectively abut against left and right sides of the wall. A side of the sealing cover 82 close to the wall surface is also provided with rubber pad 63 to increase friction with the wall surface.

The shielding shell 81 is sleeved on the mounting shell 8 and is slidably connected to the mounting shell 8. The mounting shell 8 is provided with a slide rail, and the shielding shell 81 is provided with a slide groove. The slide rail and the slide groove are slidably connected, allowing the shielding shell 81 to shield the punch-free mounting assembly, avoiding exposure of the mounting assembly for a more aesthetically pleasing appearance.

The present disclosure provides a curtain, including the punch-free mounting assembly as described above.

Although the present disclosure is disclosed above, the protection scope of the present disclosure is not limited thereto. Those skilled in the art can make various changes and modifications without departing from the spirit and scope of the present disclosure. Such changes and modifications shall fall within the protection scope of the present disclosure.

What is claimed is:

1. A punch-free mounting assembly, comprising: a housing, a rotating base, and a main body, wherein the rotating base is partially accommodated in the housing and is rotatably connected to the housing; the rotating base is provided with an axially-through accommodation cavity; the main body is slidably fitted through the accommodation cavity; a limiting member is slidably sleeved on the main body; an outer wall of the limiting member is threadedly connected to an inner wall of the accommodation cavity; a first limiting portion is radially formed outside the main body; the first limiting portion is slidably connected to the accommodation cavity and abuts against one end of the limiting member; and when the rotating base is rotated, the limiting member moves axially along the accommodation cavity until the limiting member is tightly pressed against the first limiting portion, wherein axial movement of the main body is limited.

2. The punch-free mounting assembly according to claim 1, wherein a positioning pin is fitted through the housing; an outer wall of the rotating base is provided with an annular positioning groove; and one end of the positioning pin is limited within the positioning groove and is rotatably connected to the positioning groove, wherein the rotating base is axially positioned.

3. The punch-free mounting assembly according to claim 1, wherein a second limiting portion is radially formed outside the main body; the second limiting portion is axially slidably connected to the accommodation cavity; a spring is sleeved on the main body; and the spring comprises a first end abutting against the second limiting portion and a second end abutting against an inner bottom wall of the housing or the rotating base.

4. The punch-free mounting assembly according to claim 3, wherein the limiting member is slidably sleeved on the second limiting portion; and a cross-section of the second limiting portion is non-circular, wherein rotation between the limiting member and the main body is prevented.

5. The punch-free mounting assembly according to claim 1, wherein the main body is axially slidably connected to the housing; a bottom of the main body is connected to a limiting piece; and the limiting piece abuts against a bottom of an outer wall of the housing to limit a movement distance of the main body.

6. The punch-free mounting assembly according to claim 1, wherein the housing is internally provided with a thrust ball bearing; the thrust ball bearing is sleeved on the main body; and two axial ends of the thrust ball bearing respectively abut against a bottom wall of the rotating base and an inner bottom wall of the housing.

7. The punch-free mounting assembly according to claim 1, wherein the rotating base is provided with a turntable portion; and the turntable portion is provided with a plurality of teeth or a regular-polygon cross-section.

8. The punch-free mounting assembly according to claim 1, further comprising a connecting member, wherein the connecting member is connected to a rubber pad for abutting against a wall; an upper end of the main body is recessed to form a mounting cavity; a bottom of the connecting member protrudes to form a connecting portion; a first limiting groove is recessed in the mounting cavity; a first limiting member is radially formed outside the connecting portion; and the first limiting member is limited within the first limiting groove and is movably connected to the first limiting groove, correcting a deviation and adapting to a non-vertical wall surface.

9. The punch-free mounting assembly according to claim 1, wherein the housing is a first housing; the first housing is rotatably connected to the main body, facilitating mounting on a roller shade; or the housing is a second housing; the second housing is internally provided with a protruding second limiting member; a second limiting groove is recessed in the main body; and the second limiting member is limited within the second limiting groove and is axially slidably connected to the second limiting groove, wherein rotation between the second housing and the main body is prevented, facilitating mounting on a pleated shade.

10. A curtain, comprising the punch-free mounting assembly according to claim 1.

11. The curtain according to claim 10, wherein in the punch-free mounting assembly, a positioning pin is fitted through the housing; an outer wall of the rotating base is provided with an annular positioning groove; and one end of the positioning pin is limited within the positioning groove and is rotatably connected to the positioning groove, wherein the rotating base is axially positioned.

12. The curtain according to claim 10, wherein in the punch-free mounting assembly, a second limiting portion is radially formed outside the main body; the second limiting portion is axially slidably connected to the accommodation cavity; a spring is sleeved on the main body; and the spring comprises a first end abutting against the second limiting portion and a second end abutting against an inner bottom wall of the housing or the rotating base.

13. The curtain according to claim 12, wherein in the punch-free mounting assembly, the limiting member is slidably sleeved on the second limiting portion; and a cross-section of the second limiting portion is non-circular, wherein rotation between the limiting member and the main body is prevented.

14. The curtain according to claim 10, wherein in the punch-free mounting assembly, the main body is axially slidably connected to the housing; a bottom of the main body is connected to a limiting piece; and the limiting piece abuts against a bottom of an outer wall of the housing to limit a movement distance of the main body.

15. The curtain according to claim 10, wherein in the punch-free mounting assembly, the housing is internally provided with a thrust ball bearing; the thrust ball bearing is sleeved on the main body; and two axial ends of the thrust ball bearing respectively abut against a bottom wall of the rotating base and an inner bottom wall of the housing.

16. The curtain according to claim 10, wherein in the punch-free mounting assembly, the rotating base is provided with a turntable portion; and the turntable portion is provided with a plurality of teeth or a regular-polygon cross-section.

17. The curtain according to claim 10, wherein the punch-free mounting assembly further comprises a connecting member, wherein the connecting member is connected to a rubber pad for abutting against a wall; an upper end of the main body is recessed to form a mounting cavity; a bottom of the connecting member protrudes to form a connecting portion; a first limiting groove is recessed in the mounting cavity; a first limiting member is radially formed outside the connecting portion; and the first limiting member is limited within the first limiting groove and is movably connected to the first limiting groove, correcting a deviation and adapting to a non-vertical wall surface.

18. The curtain according to claim 10, wherein in the punch-free mounting assembly, the housing is a first housing; the first housing is rotatably connected to the main body, facilitating mounting on a roller shade; or the housing is a second housing; the second housing is internally provided with a protruding second limiting member; a second limiting groove is recessed in the main body;

and the second limiting member is limited within the second limiting groove and is axially slidably connected to the second limiting groove, wherein rotation between the second housing and the main body is prevented, facilitating mounting on a pleated shade.

* * * * *